March 29, 1949.   M. L. BENJAMIN ET AL   2,465,837
COLLET CHUCK
Filed Jan. 25, 1946
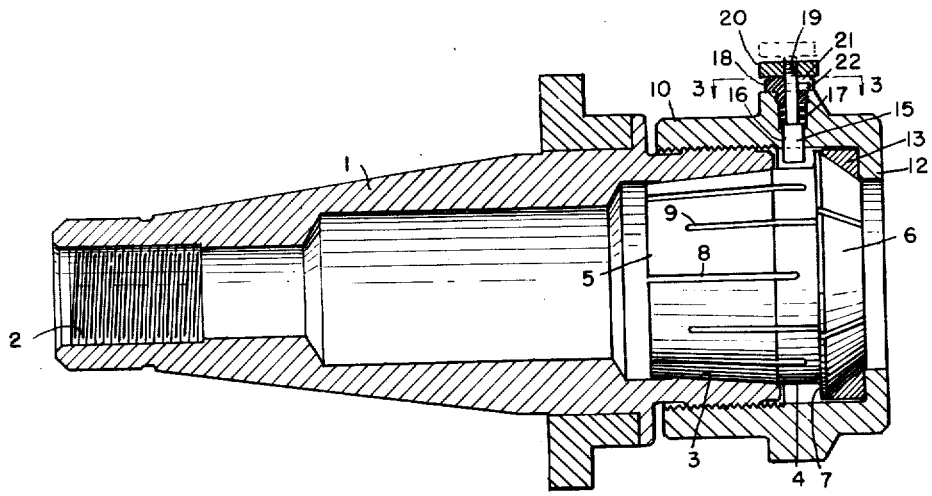
Fig. 1
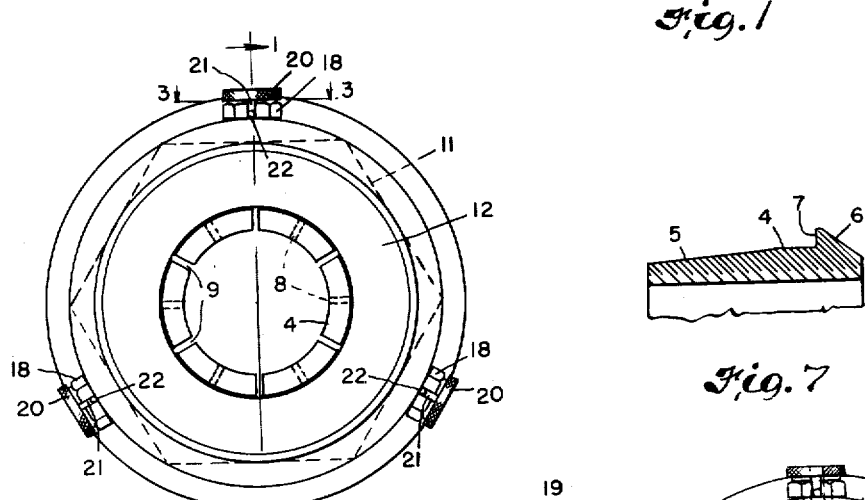
Fig. 2   Fig. 7
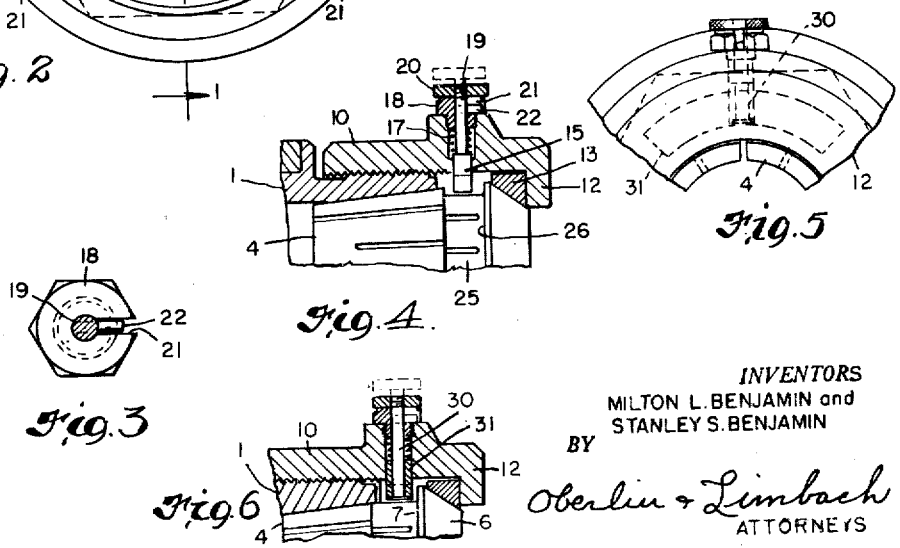
Fig. 3   Fig. 4   Fig. 5
Fig. 6
INVENTORS
MILTON L. BENJAMIN and
STANLEY S. BENJAMIN
BY Oberlin & Limbach
ATTORNEYS March 29, 1949.

2,465,837

UNITED STATES PATENT OFFICE 2,465,837

COLLET CHUCK

Milton L. Benjamin, Cleveland, and Stanley S. Benjamin, University Heights, Ohio; said Stanley S. Benjamin assignor to said Milton L. Benjamin Application January 25, 1946, Serial No. 643,334

5 Claims. (Cl. 279—56)

The present improvements relate as indicated to chucks of the type in which a tap or like tool, or work-piece, is gripped by a contractible and expansible collet.

In chucks of this type the collet is received in a shank formed with an outwardly tapered bore and the collet is formed with an external surface of corresponding taper, so that when forced longitudinally inwardly of the shank it will be contracted onto the tool or work-piece. Where the chuck is employed in heavy duty work it is desirable that the angle of the taper in question be as little as possible, e. g. 10° or less, in order to increase the wedge action between the collet and supporting shank so as to provide correspondingly increased gripping action. However, unless the angle be considerably greater than just indicated, e. g. exceeds 15° or 20°, the collet is not self-releasing, i. e. will remain wedged in the supporting member even though endwise pressure thereon be removed.

One principal object of the present invention accordingly is to provide means whereby in a chuck of the type in question, where the coacting faces are thus of small angularity, the collet may be positively and easily forced out of the bore of the shank in order to release the tool or workpiece held within the collet. A further object is to provide such means which may be readily incorporated in the chuck structure, without unduly encumbering the same. Still another object is to provide means for the purpose in question which will not interfere in any way with the assembly and disassembly of the chuck. Finally, the present improvements also include an improvement in the construction of the collet itself involving a special hardening treatment thereof, whereby the inner surface thereof is left in its initial, soft, state.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a central longitudinal section of a chuck embodying our present improvements;

Fig. 2 is a front end elevation thereof as viewed from the right in Fig. 1, the plane of the section on which the latter figure is taken being indicated by the line 1—1;

Fig. 3 is a transverse section of a detail, the plane of the section being indicated by the lines 3—3 on Figs. 1 and 2, respectively;

Fig. 4 is a broken section on the same plane as that of Fig. 1 but showing a modification in construction;

Fig. 5 is a broken end view showing still another modification;

Fig. 6 is a sectional view of the latter taken on the plane indicated by line 6—6, Fig. 5; and Fig. 7 is a broken section of the collet by itself likewise on the same plane as Fig. 1.

The main elements of the chuck as illustrated in Figs. 1 and 2 of the drawing are those familiarly found in chucks of the type in question and are subject to the modifications usual in such chucks. Thus the outer element comprises a hollow cylindrical member 1 ordinarily referred to as the shank, said member being provided at its rear end with internal threads 2 whereby it may be mounted on a correspondingly externally threaded spindle. However, it will be understood that such end of the member may equally well consist of a shank suitable for connection to a socketed driving member.

The forward portion 3 of the interior wall or bore of member 1 flares outwardly, i. e. toward the forward end of the member, the angle which such surface makes to the axis of the member being preferably 10° or less. The collet 4, which is mounted within the portion of member 1 just described, is formed exteriorly with a complementary conical surface 5 which is designed to coact with such surface 3 of the member. In addition, the collet at its forward end is provided with a conical face 6 which inclines at an angle opposite to that of face 5 and is of considerably greater angularity. Said face 6 at its inner edge is furthermore of greater diameter than the body of the collet so as to form a rearwardly directed shoulder 7 thereon which serves a purpose presently to be described.

The collet, as usual, is longitudinally intersected by slots 8 and 9 which extend alternately from opposite ends thereof almost to the other end, so that when the collet is forced inwardly it will be contracted and thus caused to grip the stem or shank of a tool inserted within the same or similarly to grip a work-piece, if desired. It will be understood that the collet will be made of tempered steel or equivalent metal, so that upon contracting pressure being released it will expand and resume its normal shape or diameter.

However, as previously explained where the angle of the coacting faces on the collet and member is lower than 15°, the friction of the engaging faces is sufficiently great to prevent movement of the collet outwardly by its inherent expansive force.

Accordingly, the nose-piece 10 which is employed as usual to force the collet inwardly, is provided also with means whereby the latter may be forcefully withdrawn from within the supporting member 1. Said nosepiece, as usual, is threaded upon the forward portion of the member 1 within which the collet is received, being formed with a polygonal section 11 (see Fig. 2) to permit engagement of a wrench or similar tool therewith for the purpose of rotating the same. At its outer end said nosepiece is formed with an inwardly directed flange 12 which is adapted to engage with the outer inclined bevelled surface 6 of the collet through the medium of an interposed oppositely bevelled ring 13. Accordingly, when the nose-piece is rotated so as to be moved inwardly on the supporting member 1 the effect will be to force the collet inwardly and thus contract the same due to the engagement of the coacting surfaces 3 and 5, supplemented by the action of the ring 13 which assists in contracting the outer bevelled end of the collet.

As shown in Fig. 1, such forward bevelled face 6 of the collet and thus the rearwardly directed shoulder 7 which bounds the inner edge of such face, are so located relatively to the oppositely inclined face 5 of the collet that when the latter is thus forced inwardly an annular space will be left clear between such shoulder and the outer end of the supporting member 1. Mounted in the nose-piece at points spaced equal distances circumferentially thereabout are radially inwardly directed pins or plungers 15, preferably three in number as shown. These pins are preferably reciprocably held in corresponding radial bores 16 in the nose-piece, the outer portions of which are enlarged to receive springs 17 held in place therein by a nut 18. The pins are provided with stems 19 which extend through such nuts and are fitted at their outer ends with knurled heads 20. At one point in the circumference of each nut 18 there is cut a radial slot or notch 21 adapted to receive a corresponding radial projection 22 on the stem 19 of the pin or plunger 15.

As a result of the construction just described, when the projections 22 thus carried by the respective plungers are seated in the slots 21 of the corresponding nuts 18, said pins or plungers under the action of the corresponding springs will be caused to project radially within the nose-piece into position where they are adapted to engage with the rearwardly directed shoulder 7 on the collet when the nose-piece is rotated so as to move it outwardly on supporting member 1. As a result of such engagement outwardly directed pressure may be applied to the collet sufficient to overcome the frictional engagement between bevelled surface 5 thereon and coacting surface 3 of said member. When it is desired to disassemble the collet from the nose-piece, the several plungers 15 are simply pulled outwardly by means of the heads 20 thereon and thereupon such heads rotated so as to cause projections 22 on the plunger stems to rest on top of the corresponding nuts 18. In this position, as shown in dotted outline in Fig. 1, the inner ends of the plungers will clear the shoulder 7 on the collet.

In the modified form of construction illustrated in Fig. 4 instead of forming the collet simply with a rearwardly directed shoulder 7 the latter is formed with an encircling groove 25, the one wall 26 of which will cooperate with the plungers 15 in the same manner as before.

The further modification illustrated in Figs. 5 and 6 relates to the form of the radially inwardly projecting element on the nose-piece which engages the outer end of the collet in the manner and for the purpose hereinbefore set forth. Under certain circumstances, and particularly in sizes of the collet where considerable pressure requires to be exerted in order to force the collet outwardly in order to disengage the same, the pins or plungers 15, because of the limited area of their contact with shoulder 7, may be subject to undue wear and at the same time have a tendency to wear the shoulder in localized areas, in other words to dig into the latter. Accordingly, in such modified construction the pins or plungers 30 which replace such pins or plungers 15 and are otherwise of the same construction, have arcuate shoes 31 respectively attached to their inner ends and contact with the shoulder when desired is had through such shoes instead of directly by the pins. In Figs. 5 and 6 it has been deemed necessary to illustrate only one such pin thus fitted with its arcuate shoe, it being understood that as in the case of pins 15 three will desirably be employed equally spaced about the circumference of the nose-piece. It will also be understood that such shoes are of such thickness or depth in a radial direction that when the plungers are moved to their outer positions the shoes will clear the shoulder 7 in the same manner as the inner ends of pins 15 clear such shoulder.

In making a collet of the type employed in our present improved chuck it is essential, as indicated, that tempered steel or equivalent metal be employed so that it will possess the necessary resiliency or spring to function in the manner required. However, in tempering the collet uniformly, as has heretofore been the practice, the result has been to harden equally the inner and outer faces, whereas such hardening is objectionable in the case of such inner tool gripping face. In other words, the gripping action of the latter will be more effective if the surface be left in its initial relatively "soft" state. We have found that by proper disposition of carburizing materials and application of heat to the collet, in the course of its manufacture, the body thereof may be hardened or tempered as shown by the double-hatching in Fig. 7 to a substantial depth inwardly while still leaving the inner portion, both longitudinally and throughout its entire circumferential extent, in substantially unhardened condition. Accordingly, when the collet is compressed, the tool engaged thereby is engaged by such softer interior face, while the outer face which coacts with the tapered bore of the supporting member is hard enough not only to be wear resistant but also to impart the desired degree of resiliency to the collet.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. In a chuck, the combination of a hollow cylindrical supporting member, a contractible collet reciprocably mounted therein, said member and collet being formed with co-acting faces whereby the latter is contracted upon movement inwardly of the former, a nose-piece surrounding said member and reciprocable longitudinally thereof, an inwardly directed flange on said nose-piece engaging the outer end of said collet, whereby the latter may be forced into said member, a rearwardly facing shoulder on said collet, and a spring-actuated, radially inwardly projecting, plunger on said nose-piece adapted normally to engage said shoulder, and means adapted to retain said plunger out of such engaging position when not desired.

2. In a chuck, the combination of a hollow cylindrical supporting member, a contractible collet reciprocably mounted therein, said member and collet being formed with co-acting faces whereby the latter is contracted upon movement inwardly of the former, a nose-piece threaded upon said member so as to be reciprocable longitudinally thereof upon relative rotation of said nose-piece and member, an inwardly directed flange on said nose-piece engaging the outer end of said collet, whereby the latter may be forced into said member upon rotation of said nose-piece in one direction, a rearwardly facing shoulder on said collet, and a plurality of circumferentially spaced, spring-actuated, radially inwardly projecting plungers on said nose-piece adapted to engage said shoulder, whereby said collet may be withdrawn from said member upon rotation of said nose-piece in the opposite direction.

3. In a chuck, the combination of a hollow cylindrical supporting member, a contractible collet reciprocably mounted therein, said member and collet being formed with co-acting faces whereby the latter is contracted upon movement inwardly of the former, a nose-piece threaded upon said member so as to be reciprocable longitudinally thereof upon relative rotation of said nose-piece and member, an inwardly directed flange on said nose-piece engaging the outer end of said collet, whereby the latter may be forced into said member upon rotation of said nose-piece in one direction, a rearwardly facing shoulder on said collet, a plurality of circumferentially spaced, spring-actuated, radially inwardly projecting plungers on said nose-piece adapted to engage said shoulder, whereby said collet may be withdrawn from said member upon rotation of said nose-piece in the opposite direction, and means adapted to retain said plungers out of such engaging position when desired.

4. In a chuck, the combination of a supporting member and a collet longitudinally reciprocable relative to one another and formed with co-acting faces so arranged that opposite relative movements thereof causes radial expansion and contraction of said collet, a nose-piece reciprocably connected to said supporting member and engageable with an end of said collet to effect relative movement of said supporting member and collet in one direction, a shoulder on said collet facing in a direction opposite to the end thereof engaged by said nose-piece, and a radially inwardly projecting element on and movable longitudinally with said nose-piece engageable with said shoulder to effect relative movement of said supporting member and collet in an opposite direction.

5. In a chuck, the combination of a hollow supporting member, a contractible collet reciprocably mounted therein, said member and collet being formed with co-acting faces whereby the latter is contracted upon movement inwardly of the former, a nose-piece reciprocably connected to said member, an inwardly directed flange on said nose-piece engaging the outer end of said collet whereby the latter may be forced into said member, a rearwardly facing shoulder on said collet, and a radially inwardly projecting element on and reciprocable with said nose-piece adapted to engage said shoulder for positively moving said collet outwardly of said supporting member when said nose-piece is moved outwardly of said member.

MILTON L. BENJAMIN.
STANLEY S. BENJAMIN.

REFERENCES CITED

The following references are of record in the file of this patent:

UNITED STATES PATENTS

| Number | Name | Date |
|---|---|---|
| 1,570,251 | Hoagland | Jan. 19, 1926 |
| 2,087,868 | Baxendale | July 20, 1937 |
| 2,177,979 | Davis | Oct. 31, 1939 |
| 2,272,185 | Chittenden | Feb. 19, 1942 |

FOREIGN PATENTS

| Number | Country | Date |
|---|---|---|
| 46,263 | Norway | Mar. 18, 1929 |
| 34,404 | Switzerland | June 30, 1905 |